United States Patent [19]
Gröning et al.

[11] 3,887,230
[45] June 3, 1975

[54] FASTENING MEANS FOR PASSENGER SEATS

[75] Inventors: Uwe Gröning, Hamburg; Uwe Lüthgens, Buxtehude, both of Germany

[73] Assignee: Messerschmitt-Bölkow-Blohm GmbH, Munich, Germany

[22] Filed: June 24, 1974

[21] Appl. No.: 482,073

[30] Foreign Application Priority Data
June 29, 1973 Germany.......................... 2333037

[52] U.S. Cl. ................. 297/232; 248/188; 248/429
[51] Int. Cl. ............................................. A47c 4/02
[58] Field of Search ........... 297/232, 257, 248, 443, 297/445; 248/188, 429

[56] References Cited
UNITED STATES PATENTS

| | | | |
|---|---|---|---|
| 1,603,042 | 10/1926 | Geary | 248/429 |
| 2,944,589 | 7/1960 | Balfour | 297/232 |
| 3,236,484 | 2/1966 | Hozeski | 248/188 |
| 3,392,954 | 7/1968 | Malitte | 248/429 |
| 3,466,085 | 9/1969 | Webb | 297/232 |

Primary Examiner—Francis K. Zugel
Attorney, Agent, or Firm—Woodhams, Blanchard and Flynn

[57] ABSTRACT

Fastening means for connecting aircraft or vehicle seats to supporting structure. For connecting aircraft or vehicle seats to supporting structure, there is provided means by which same can be accomplished quickly and easily and without the necessity for use of tools. A bar of rectangular cross section is positioned across the underside of single or multiple seats as desired. A tensioning screw extends upwardly through the base structure against a wedging spring which upon being tensioned tightly clamps interlocking flanges on the bar and base structure, respectively. A retractable pilot pin extends coaxially through said screw into a selected opening in said bar for positioning purposes. Thus, to readjust the spacing of the legs with respect to a given seating unit it is necessary only to retract the positioning pin, loosen the clamping screw and move the leg carrying base structure to a new desired position, reinsert the positioning pin and retighten the clamping screw, all of which can be carried out both quickly and manually.

5 Claims, 3 Drawing Figures

FASTENING MEANS FOR PASSENGER SEATS

FIELD OF THE INVENTION

The invention relates to fastening means for passenger seats for use on aircraft or various types of vehicles, which seats have a bar on their undersides, on which bar seat supporting base structure is movably and securably arranged.

BACKGROUND OF THE INVENTION

Aircraft passenger seats are usually secured with their legs on seat tracks which are provided on the floor of the aircraft cabin. Depending on the seating arrangement, for example the number of such seats which are mounted on a bar and/or the width of the individual seats, the seat tracks are located at different spacings in the floor of the aircraft cabin. In order that the seats or the seating arrangements can be used in aircraft with different seat track spacings, it is known to support the legs movably and securably on a bar utilized in the seating arrangement, that is as a part of the passenger seats. The bars have an approximately circular cross section. The legs are secured on the bars by means of approximately half-shell-shaped gripping and clamping jaws which are provided on the legs, which grip around the bar and which are clamped by clamping screws operated from the outside. For this tools are needed. Furthermore it is not possible to clamp the legs in any desired positions on the bars, because the gripping and clamping jaws can be clamped only at points which are free of the connecting means between the seats and the bars.

SUMMARY OF THE INVENTION

The purpose of the invention is to produce fastening means for passenger seats for use on aircraft or various types of vehicles, the adjustable legs of which can be adjusted without the need for tools to the respective seat track spacings and can be clamped on the bar. This is achieved by the invention by providing fastening means for passenger seats for use on aircraft or various types of vehicles, which fastening means is constructed in the above-described manner, by providing the base structure with a locking pin which is resiliently urged into a hole of the bar and further by providing between a planar underside of the bar and a sliding surface of the base structure a wedge spring which can be clamped by means of a knurled screw.

In this manner, for adjustment of the leg carrying base structure, the knurled screw needs only to be loosened manually and the locking pin can be pulled from the bore. After movement of the legs into the desired new position on the bar, the locking pin is released for engagement into the appropriate hole and the knurled screw is again tightened manually. Neither clamping means consisting of screws and nuts, nor tools required for their operation, are needed so that the adjustment of the legs to the respective seat track spacings is accomplished quickly and no tool needs to be carried along into the aircraft cabin. This has the advantage that neither tools nor screws, nuts or washers can be left by mistake in the aircraft cabin which for safety reasons must be absolutely avoided. The invention thus promotes accuracy in changing over of aircraft to different seating arrangements and saves work. The legs abut with a sliding surface a planar underside of the bar so that clamping means for securing the legs against rotation on the bar are not required.

A further development of the invention consists in that the bar has a rectangular cross section and in that the leg carrying base structure by means of upper guides rest movably against the upper sides of flange-like projections on the bar. The rectangular bar cross section provides advantageous planar outer surfaces for connecting the bar to the passenger seats. Simple sliding surfaces are used for the support of the legs, which support can be moved as desired, on the bar, which sliding surfaces require no expensive fitting operations.

The invention further provides that the locking pin is arranged within the knurled screw and that the end of the knurled screw is supported rotatably in an opening in the wedge spring. This results in a centralized method of construction which requires only one hole in the base structure for receiving the knurled screw.

The knurled screw and the wedge spring are according to a further feature of the invention arranged in a trough-shaped recess of the leg. They are thus well protected.

As a wedge spring, a leaf spring can be used with wedge surfaces provided at both ends. By stretching or bending the leaf spring by means of the knurled screw, the clamping connection is created or released.

BRIEF DESCRIPTION OF THE DRAWINGS

One exemplary embodiment of the invention is illustrated in the drawings, in which.

DETAILED DESCRIPTION

Figure 1:
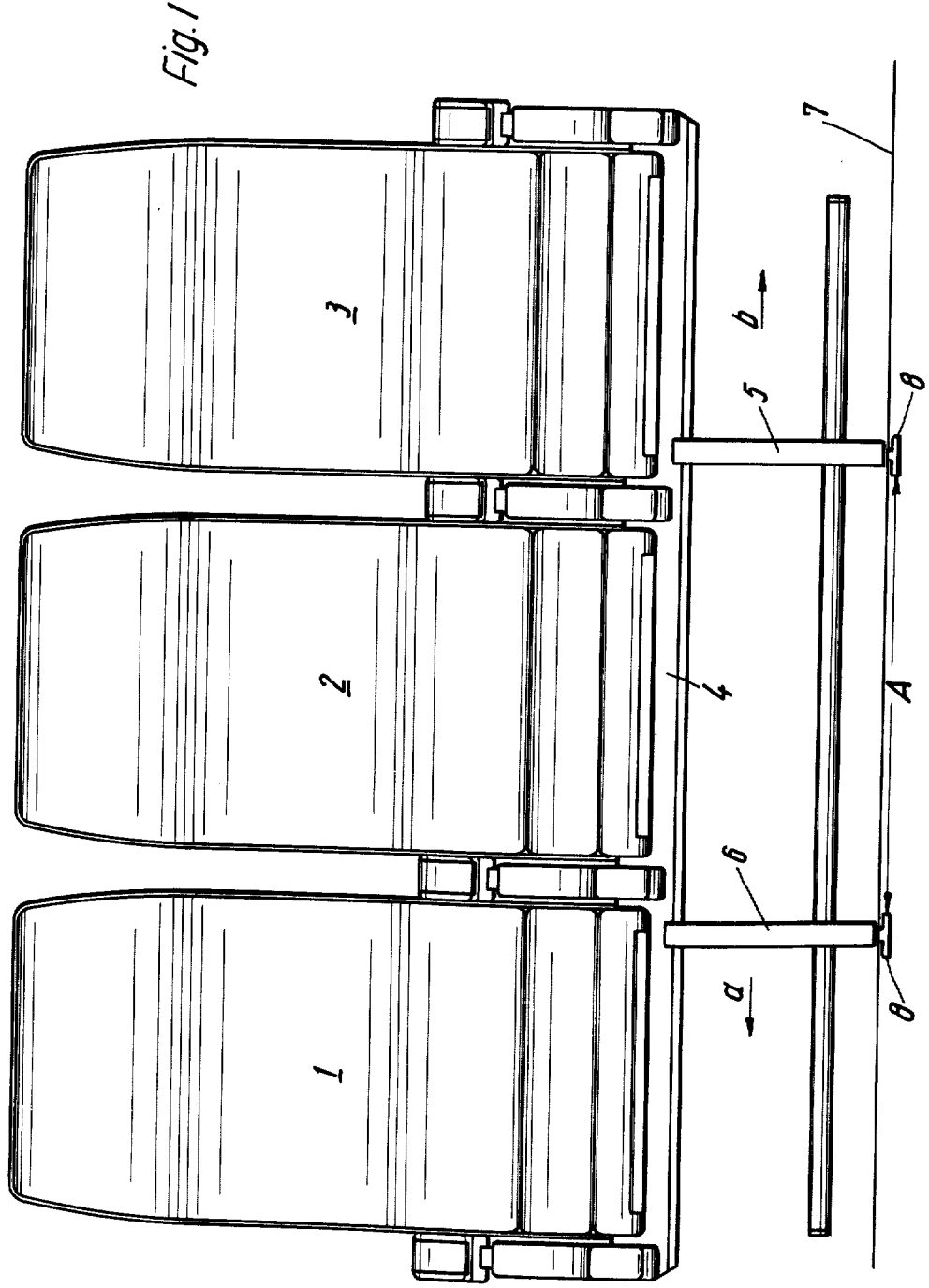
FIG. 1 is a front view of a seating arrangement of three side-by-side positioned air-passenger seats.

The passenger seats 1, 2, 3, which are illustrated in FIG. 1 have a bar 4 across the bottom of each thereof. Leg carrying base structures 5, 6 which support the seats are arranged securably and movably in the directions of the arrows $a$ and $b$ on said bar. The legs rest on seat tracks 8 which are installed in the cabin floor 7 of an aircraft (not illustrated) and are clamped on said tracks.

Figure 2:
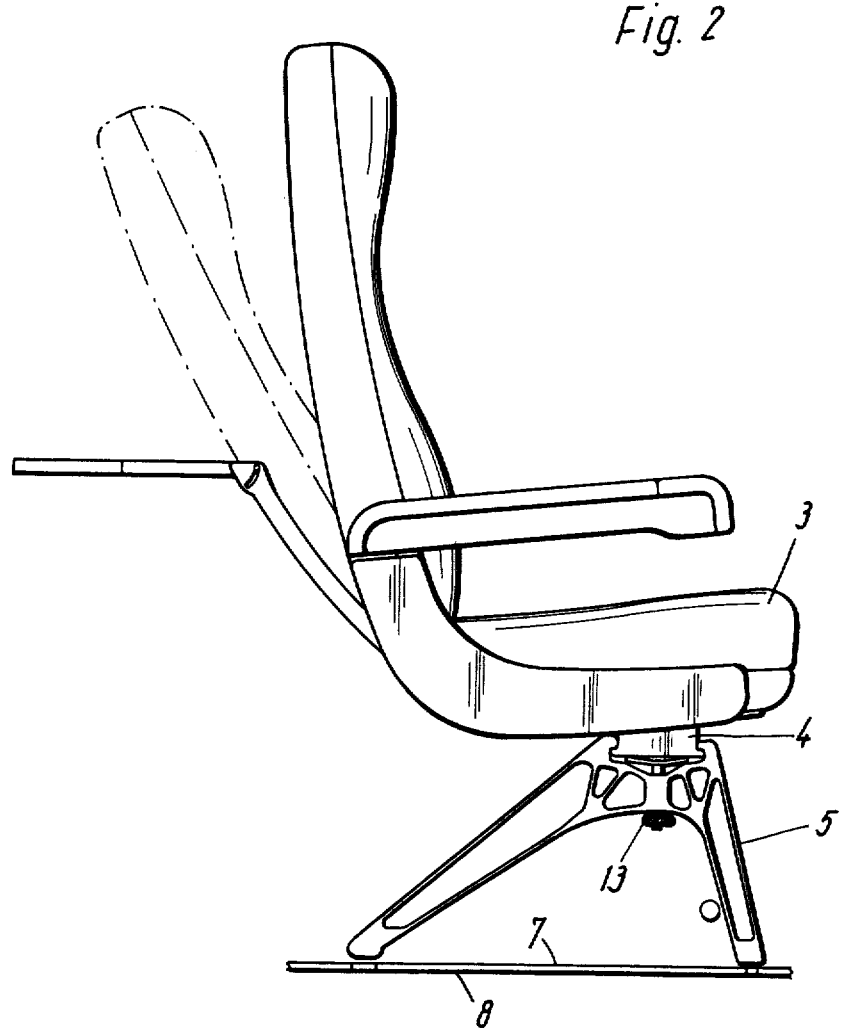
FIG. 2 is a side view of the seating arrangement according to FIG. 1.
Figure 3:
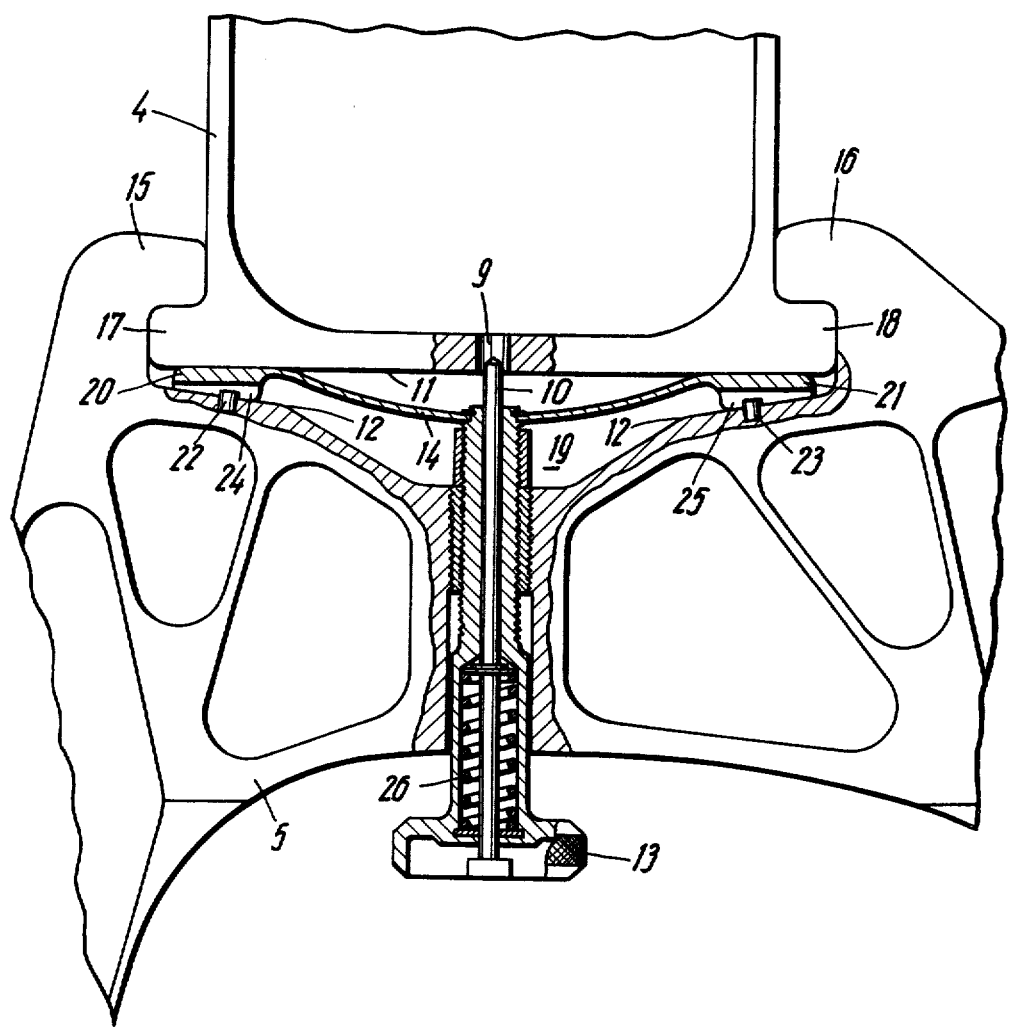
FIG. 3 is a vertical cross section of a portion of the base of the seating arrangement according to FIGS. 1 and 2.

As shown in FIGS. 2 and 3, the base structures 5, 6 have at their respective undersides a locking pin 10 which engages by means of spring force a hole 9 in the bar 4. Between the planar under surface 11 of the bar 4 and a sliding surface 12 of the base structures 5, 6, there is provided a wedge spring 14 which can be clamped by means of a knurled screw 13.

The bar 4 is hollow and has a rectangular cross section. The base structures 5, 6 rest movably against the upper sides of flanges 17, 18 of the bar 4 by means of upper guides 15, 16.

In FIG. 3 it is apparent that the locking pin 10 is arranged within the knurled screw 13. The end of the knurled screw is supported rotatably in a hole in the wedge spring 14. The knurled screw and the wedge spring are arranged in a troughshaped recess 19 of the base structures 5, 6. In the exemplary embodiment, the wedge spring 14 consists of a leaf spring having wedge surfaces 20, 21 provided at both ends. The wedge surfaces are secured against a shifting or rotating of the wedge spring when the knurled screw 13 rotates by means of centering pins 22, 23 which are supported in the base structure and which extend into longitudinal recesses 24, 25 of the wedge spring.

If for example the seating arrangement which consists of the three side-by-side arranged air-passenger seats 1, 2, 3 is to be installed into an aircraft, the seat tracks of which are installed at the distance A (FIG. 1) in the cabin floor 7, the knurled screws 13 of the base structures 5, 6 are released manually by rotation, so that the wedge springs 14 are relieved. This releases the clamping connections between the base structures 5, 6 and the bar 4. The locking pins 10 are now retracted from the bores 9 and the base structures 5, 6 are moved, depending on their present positions, in the directions of the arrows *a* or *b* on the bar 4 so that they can be placed into the seat tracks 8 and can be clamped in said tracks by not illustrated clamping means. The locking pins 10 (FIG. 3) thus engage, following the force of a pressure spring 26 associated with said locking pins, a bore 9 of the bar 4, which bore is associated with the respective seat track spacing and in this manner lock the base structures 5, 6 on the bar 4 in the position which corresponds to the new seat track spacing. Thereafter the knurled screws 13 are tightened so that the wedge springs 14 are tensioned and again create a clamping connection with their wedge surfaces 20, 21 between the base structures 5, 6 and the bar 4.

The adjustment of the position of the legs of the air-passenger seats to the respective seat track spacings is thus done without any tools and by only a few manual operations. The legs are freely movable along the bar into any desired positions, because the bar has in the zone of its flanges 17 and 18 no connecting means for the seats capable of hindering such movement. The securement can be used in the same manner for passenger seats which are to be installed in vehicles with seat tracks having different spacings. The seat arrangements for passengers of aircraft or various types of vehicles may differ both in the number of the side-by-side arranged seats and also in the width of the individual seats. Thus it is possible to equip individual seats and also seat arrangements with two, three or four side-by-side positioned seats with the legs which can be adjusted as desired in the afore-described manner.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A securement arrangement for passenger seats for use on aircraft and various types of vehicles, same having a bar on their undersides, on which bar there are arranged movably and securably base structures which support the seats, comprising the improvement wherein the base structures have a locking pin which engages a bore of the bar by means of spring force and that between the underside of the bar and a sliding surface of the base structures there is provided a wedge spring which can be clamped by means of a knurled screw.

2. An improved securement arrangement according to claim 1, wherein the bar has a rectangular section and that the base structures rest movably against the upper sides of flangelike projections of the bar by means of upper guides.

3. An improved securement arrangement according to claim 1, wherein the locking pin is arranged within the knurled screw and that the end of the knurled screw extends rotatably through a hole in the wedge spring.

4. An improved securement arrangement according to claim 1, wherein the knurled screw and the wedge spring are arranged in a troughlike recess of the base structures.

5. An improved securement arrangement according to claim 1, wherein the wedge spring comprises a leaf spring having wedge surfaces provided at each end thereof.

* * * * *